United States Patent [19]
Bjorck et al.

[11] Patent Number: 5,617,769
[45] Date of Patent: Apr. 8, 1997

[54] THERMALLY COMPLIANT BAR FEEDING MACHINE

[75] Inventors: Paul M. Bjorck, Elmira Heights; Babak R. Raj; Terrence M. Sheehan, both of Elmira; Daniel P. Soroka, Horseheads, all of N.Y.

[73] Assignee: Hardinge Brothers, Inc., Elmira, N.Y.

[21] Appl. No.: 323,259

[22] Filed: Oct. 14, 1994

[51] Int. Cl.⁶ .................................................. B23B 13/00
[52] U.S. Cl. .................................. 82/127; 82/163; 82/126; 414/14
[58] Field of Search ............................. 82/124, 126, 127, 82/163; 414/14, 15, 17, 18

[56] References Cited

U.S. PATENT DOCUMENTS

| | | | |
|---|---|---|---|
| 3,874,073 | 4/1975 | Dochterman | 29/598 |
| 4,049,173 | 9/1977 | Gomez-Aleccha | 82/163 X |
| 4,100,827 | 7/1978 | Flemming | 82/163 |
| 4,292,864 | 10/1981 | Cucchi et al. | 82/126 |
| 4,420,284 | 12/1983 | Eisinger et al. | 414/17 |
| 4,507,992 | 4/1985 | Vandevoir et al. | |
| 4,596,170 | 6/1986 | Vandevoir et al. | |
| 4,624,612 | 11/1986 | Geiser et al. | |
| 4,640,157 | 2/1987 | Geiser et al. | |
| 4,649,779 | 3/1987 | Juillerat | |
| 4,672,869 | 6/1987 | Hasslauer et al. | 414/17 X |
| 4,679,470 | 7/1987 | Geiser et al. | |
| 4,889,024 | 12/1989 | Geiser et al. | |
| 5,048,383 | 9/1991 | Geiser et al. | |
| 5,121,686 | 6/1992 | Schonlau et al. | 92/163 |
| 5,146,819 | 9/1992 | Geiser et al. | |

*Primary Examiner*—M. Rachuba
*Assistant Examiner*—Henry W. H. Tsai
*Attorney, Agent, or Firm*—Cushman Darby & Cushman Intellectual Property Group of Pillsbury Madison & Sutro

[57] ABSTRACT

A bar feed assembly for receiving and guiding a bar stock to be machined in a lathe, comprises a tubular member for rotatably receiving and guiding the bar stock to be machined and a member for advancing the bar stock through the tubular members. A plurality of stabilizing bodies are provided along said tubular member in spaced apart relation and each has a compliant surface disposed in surrounding relation to the tubular member in a manner which permits axial thermal growth of the tubular members through the stabilizing bodies.

24 Claims, 3 Drawing Sheets

THERMALLY COMPLIANT BAR FEEDING MACHINE

BACKGROUND OF THE INVENTION

The present invention relates to a bar feeding machine for a lathe. More particularly, the present invention relates to an improved feeding machine which remains in alignment and in a stable condition as it feeds bar stock to be machined.

Conventional bar feeding machines typically comprise one or more tubular members for maintaining bar stock at high speeds of rotation therein as the bar stock is advanced toward the lathe. A problem associated with use of such machines is that it is difficult to maintain such high rotational speeds of the bar stock within the tubular members without causing excessive noise and vibration of the machine as a result of the high speed of rotation and resulting thermal growth of the tubular members. In addition, it is difficult to maintain the bar stock in proper alignment with the lathe.

Although there have been a number of proposals to alleviate the above problems, heretofore none have been widely accepted. For example, in U.S. Pat. Nos. 5,146,819 and 4,889,024, there is disclosed a cylindrical stabilizing body having a length at least equal to the length of the bars to be machined. The cylindrical body includes a peripheral ring connected by reinforcing ribs to each of a plurality of tubular cavities, each enclosing a respective one of a plurality of tubular members. Each of the tubular cavities are further connected by reinforcing ribs to adjacent tubular cavities. It is disclosed that this cylindrical body is normally made from extruded aluminum and can also be made from a synthetic material. However, because the cylindrical body extends substantially along the entire length of the tubular members, it is very expensive. In addition, the desired stability of the tubular members is not properly achieved.

Thus, there exists a need for a bar feeding assembly which is relatively inexpensive to manufacture, and which permits thermal growth of the tubular members in the axial direction while providing adequate stiffness in the axial and radial directions.

SUMMARY OF THE INVENTION

It is an object of the present invention to meet the need expressed above. To accomplish this, the bar feeding assembly of the present invention comprises a tubular member for rotatably receiving and guiding the bar stock to be machined, and a movable member constructed and arranged to advance the bar stock through the tubular member. Also provided are a plurality of stabilizing bodies disposed along the tubular member in spaced apart relation. The stabilizing bodies each have a compliant surface disposed in surrounding relation to the tubular member and contact the tubular member in a manner which permits axial thermal growth of the tubular member through the stabilizing bodies.

Preferably, a plurality of tubular members of different diameters are provided for receiving and guiding bar stock of different dimensions. The tubular members are adjacently arranged in parallel to one another, and a movable member advances the bar stock to be machined through a respective one of the tubular members. The stabilizing bodies are disposed along the tubular members in spaced apart relation and have compliant surfaces disposed in surrounding relation to each of the tubular members and contacting the tubular members as aforesaid.

The invention will be described further by way of example with reference to the accompanying drawings.

DETAILED DESCRIPTION OF THE DRAWINGS

Figure 1:
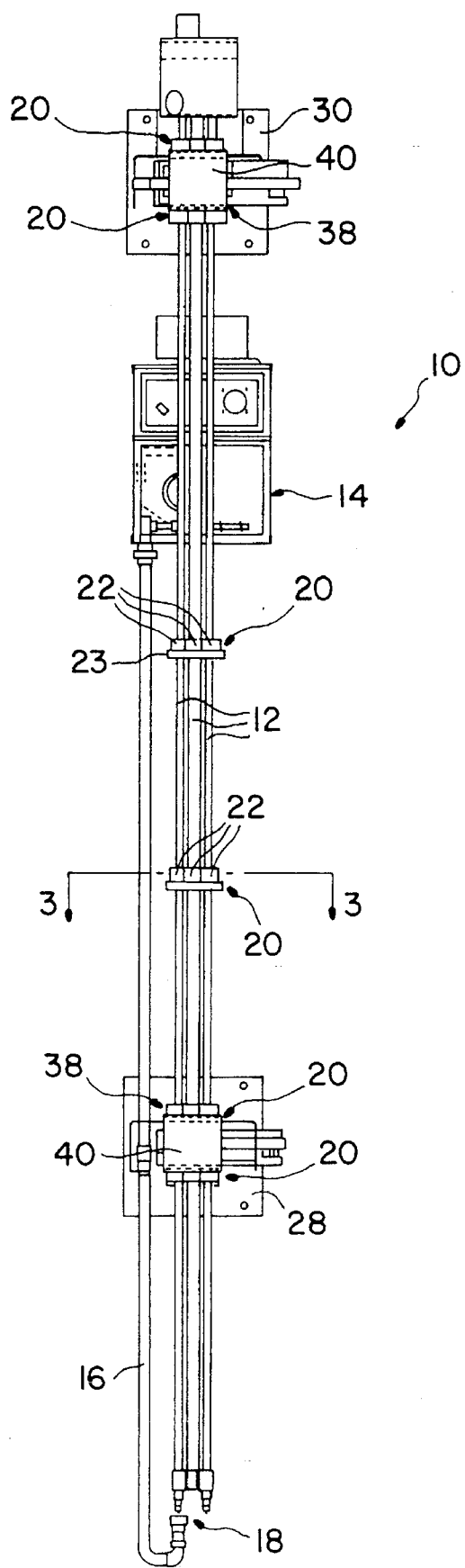
FIG. 1 is a top view showing the bar feed assembly of the present invention.

FIG. 1 is a top view generally showing the bar feed assembly 10 of the present invention. As shown, the bar feed assembly comprises a plurality of tubular members 12. While any number of such members be provided, four of such members are provided in the herein described embodiment (only three of these members can be seen in the overhead view of FIG. 1). It can be appreciated that only one tubular member may be provided. When plural tubular members are provided, each can be fashioned to have a different diameter than all others so that the bar feed assembly can accommodate bar stock of different dimensions. Of course, the tubular members can all have the same diameter if desired. The tubular members 12 receive and guide the bar stock to be machined and are preferably made of steel, although they can also be made from other types of metal or a synthetic material.

The bar feed assembly includes a hydraulic assembly 14 including a tube 16 provided with a quick-connect fitting 18 for easy connection (and disconnection) to one selected tubular member at a time. Hydraulic assembly 14 delivers oil under pressure to the tubular members 12 through tube 16 to facilitate rotation of the bar stock and the advance or feed of the bar stock through the tubular members. Alternatively, no oil is provided, and the bar stock is processed in a "dry run". The tubular members 12 are stabilized during operation of the assembly by stabilizing bodies 20 spaced along the length of the tubular members.

Figure 3:
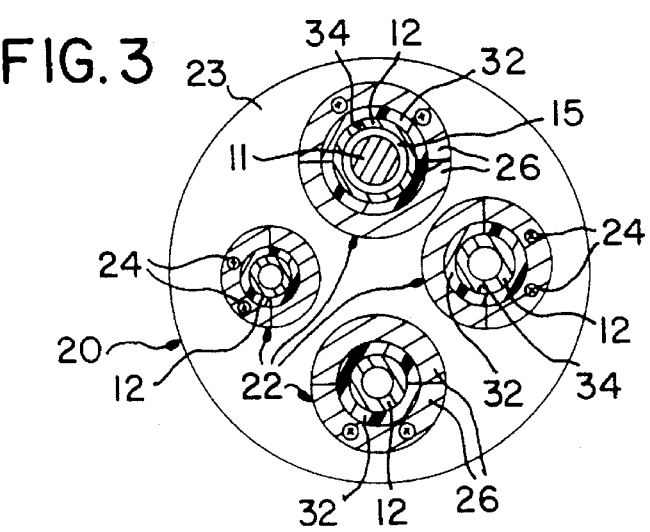
FIG. 3 is a sectional view taken along the line 3—3 in FIG. 1.
Figure 4:
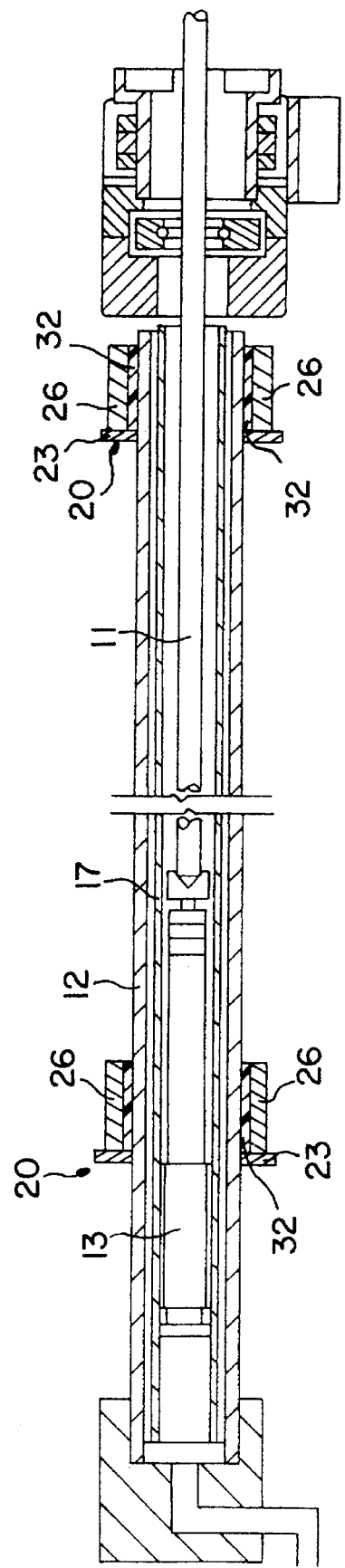
FIG. 4 is a longitudinal sectional view of a singular tubular member of the present invention.

Referring now to FIGS. 3 and 4, it can be seen that the bar stock 11 is fed through the tubular members 12 by operation of a movable member or conventional push-piston 13 acting against the rear extremity of the bar. When oil is provided, it is supplied to a chamber 15 defined between the bar stock to be machined and its respective tubular member 12 to provide hydro-dynamic support for the bar stock when the bar stock is set into rotation within the tubular member 12 by the head stock or spindle of a lathe (not shown). The bar stock 11 may have a polygonal, or as shown, a circular cross-section.

As shown in FIG. 4, it is also possible to provide an inner tube 17 within tubular member 12. This inner tube 17 is entirely free within the tubular member 12 and it encloses the bar stock 11 to be machined and the push piston 13. The rotation of the bar stock as set by the spindle of the lathe causes the formation of a hydrodynamic bearing between the inner tube 17 and the bar stock. The resulting rotation of this oil bearing sets, in turn, the floating tube into rotation which causes also a hydrodynamic bearing between the inner tube 17 and tubular member 12. This specific configuration is disclosed in U.S. Pat. No. 4,889,024, which is hereby incorporated by reference.

Figure 2:
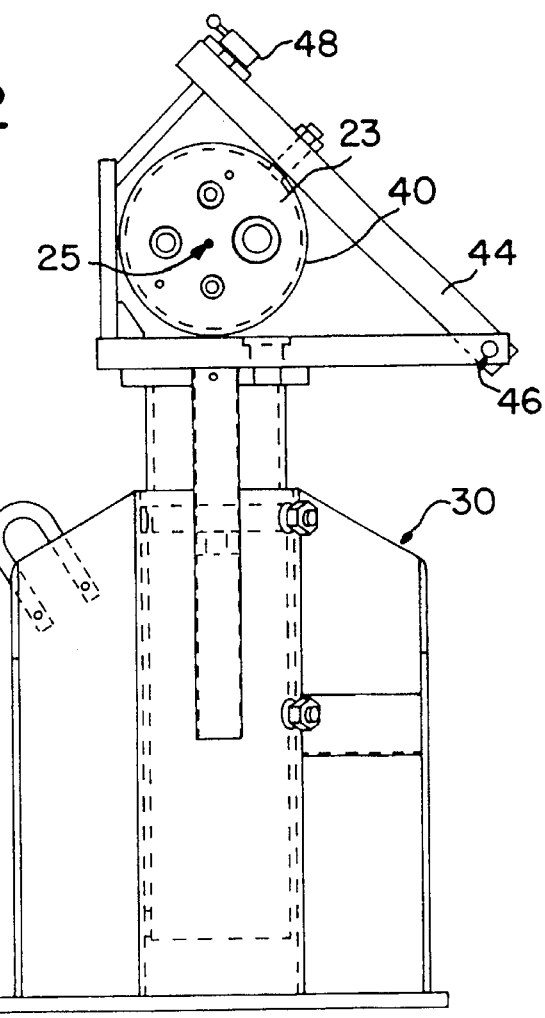
FIG. 2 is a longitudinal side view showing the bar feed assembly of the present invention mounted on a support.

It is preferable for tubular members 12 to be held by the reinforcing or stabilizing bodies 20 in symmetric relationship about a common longitudinal axis (see phantom axis 25 in FIG. 2). The tubular members 12 are rotatable about this common axis so that one of the tubular members 12 can be aligned in conjunction with the hydraulic mechanism and push piston 13 for operation with the lathe.

FIG. 3 is a cross sectional view taken through the line 3—3 in FIG. 1. There it can be seen that each stabilizing body 20 includes a plurality of clamp members, shown generally at 22, and a support disc 23 to which the clamp members are fixed by appropriate fasteners 24; the clamp members 22 thus being maintained in fixed relation with respect to one another. Each clamp member 22 is disposed in surrounding relation to one tubular member 12, and support disc 23 has a plurality of bores therethrough for accommodating the tubular members 12. As will be described below, each clamp member 22 of the stabilizing bodies provides a compliant surface which contacts the tubular members 12 in a manner which permits the tubular members to move or slide through the bodies 20 in an axial direction during thermal expansion of the tubular members when the bar stock is rotated at high speeds within the tubular members.

Each clamp member 22 consists of two clamp halves 26, preferably made of a metal such as aluminum or steel. Preferably disposed between the clamp member 22 and each respective tubular member 12 is an intermediate material 32, which may be adhered to the inner surface of each clamp half 26. The clamp halves 26 are rigidly secured to one another by appropriate fasteners (not shown) in a manner which compresses the intermediate material 32 against the tubular member 12 disposed between the clamp halves. The exterior surface of the intermediate material 32 forms a compliant surface 34, which contacts the tubular members as aforesaid. At the same time, the stabilizing bodies are sufficiently rigid to provide adequate stiffness to each tube in the axial and radial direction to minimize vibration thereof, and where more that one tube is provided, to prevent the tube being used from contacting adjacent tubes during operation.

The intermediate material 32 is most preferably formed from a rubber or resin material. Alternatively, a metal having a polished surface with a sufficiently low coefficient of friction to permit axial growth of the tubular members, or other appropriate material having a sufficiently compliant surface can be used. It can be appreciated that if metal is used as the compliant surface, the inner surface of the clamp halves (in the form of metal) can directly contact the tubular members without the provision of any intermediate material. If resin is used (i.e., as the clamp member or as the intermediate material), it should preferably be a precision setting and high lubricity polymer typically made for the machine tool industry. For example, such resin should preferably be a specially formulated, 100% solid, two component, inert filled casting compound available from ITW/ Philadelphia Resins Corporation, Montgomeryville, Pa. It is sold under the name Super Alloy Silver 500™. The aforementioned resin advantageously has relatively negligible shrinkage, excellent flowability, dimensional stability, high compressive strength, high modulus of elasticity, creep resistance, dampening properties, and low inertia as compared to metal. The resin is applied to the base in a replicating operation in which the resin material forms a very exact and smooth surface on the base material. A typical replicating operation is disclosed in our pending U.S. patent application No. 07/788,043 which is hereby incorporated by reference.

As stated above, by providing the stabilizing bodies 20 with the aforementioned compliant surfaces 34, the bar feed assembly of the present invention accommodates thermal growth of the tubular members and reduces vibrations associated with the high speed of rotation of the bar stock. In addition, when plural tubular members are provided, the tubular members can be aligned very precisely with the head stock of the lathe and maintained in precise spaced relation from one another even when rotatably indexed about axis 25. This can all be accomplished rather inexpensively.

In the broadest aspects of the invention, it can be appreciated that the stabilizing bodies 20 need not consist of the clamp members 22 or support disc 23, as a similar result may be obtained in other arrangements in which the compliant surfaces 34 is provided in a manner that enables them to accomplish their function. For example, stabilizing bodies 20 may each consist of a solid block of rubber or resin material having a plurality of bores therethrough for compressively receiving the tubular members 12, the bores each being defined by the compliant surface.

As shown in FIG. 1, the assembly is supported from beneath by support members 28 and 30, the support member 30 being shown more clearly in FIG. 2. The support members are adapted to support a barrel assembly 38 consisting of two opposing stabilizing bodies 20 and a hollow cylindrical barrel 40 extending therebetween. The hollow cylindrical barrel 40 is rigidly fixed to peripheral portions of the support discs 23 of the opposing stabilizing bodies. The forwardmost support member 30 mounts the tubular members for rotational indexing about the longitudinal axis 25.

In FIG. 2, the bar feed assembly is shown provided with a cover member 44, which is pivotable about hinge 46. When indexing is required, a torque limiting device 48 is loosened to allow cover member 44 to pivot and permit indexing of the tubular members and stabilizing bodies. When cover member 44 is re-closed and tightened by turning of torque limiting device 48, only a limited amount of force will be applied to the barrel 40 or tubular members 12, since the torque limiting device will slip after a set torque is reached. While it can be appreciated that a simple nut can be used instead of the torque limiting device, it can be has been found that the alignment of the bar feeding machine may be adversely effected by forcing such nut.

When cover 44 is opened, the tubular members can then easily be indexed so that the desired tubular member is precisely aligned for operation with the lathe. Normally only one tubular member is used at a time. While it is preferable for the uppermost positioned tubular member 12 (see FIG. 3) to contain a bar stock 11 and be operable with the lathe, it can be appreciated that, when used with an oil collector module, the system can be arranged so that any of the positions can be made operational.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A bar feed assembly for receiving and guiding a bar stock to be machined in a lathe, comprising:

a one-piece tubular member having two opposite ends and an intermediate portion therebetween, one of said ends being constructed and arranged for rotatably receiving and guiding the bar stock to be machined;

a movable member constructed and arranged to advance the bar stock through said tubular member; and a plurality of stabilizing bodies disposed along a length of said tubular member in spaced apart relation, said stabilizing bodies each having a compliant surface disposed in surrounding relation to said tubular member and contacting said tubular member in a manner which permits axial thermal growth of said tubular member through said stabilizing bodies at all positions along said intermediate portion; and a support structure disposed generally at a predetermined position along said intermediate portion of said tubular member and constructed and arranged to support said tubular member from beneath at said predetermined position, said support structure carrying said tubular member via at least one of said stabilizing bodies so as to permit said axial thermal growth of said tubular member at said predetermined position.

2. The bar feed assembly as claimed in claim 1, wherein said stabilizing bodies each comprise a clamp member and an intermediate material disposed between said clamp member and said tubular member, said intermediate material forming said compliant surface.

3. The bar feed assembly as claimed in claim 2, wherein said clamp member is formed from two semi-annular metallic sections secured to one another in a manner which compresses said compliant surface against said tubular member.

4. The bar feed assembly as claimed in claim 3, wherein said metallic sections comprise a metal selected from the group consisting of aluminum and steel.

5. The bar feed assembly as claimed in claim 2, wherein said intermediate material comprises rubber.

6. The bar feed assembly as claimed in claim 2, wherein said intermediate material comprises resin.

7. The bar feed assembly as claimed in claim 6, wherein said resin is a 100% solid, two component, and inert filled casting compound.

8. The bar feed assembly as claimed in claim 2, wherein said intermediate material comprises metal.

9. The bar feed assembly as claimed in claim 1, further comprising hydraulic means for providing oil to said tubular member to provide hydro-dynamic support to the bar stock.

10. The bar feed assembly as claimed in claim 9, wherein said oil is provided under pressure and said movable member comprises a push-piston which is movable under the force of said oil pressure.

11. The bar feed assembly as claimed in claim 10, wherein said push piston is made from a plastic material.

12. A bar feed assembly for receiving and guiding bar stocks to be machined in a lathe, comprising:

a plurality of tubular members forming tubular cavities for rotatably receiving and guiding the bar stocks to be machined, said tubular members being adjacently arranged in parallel to one another and being mounted for movement through a plurality of positions including an operative position whereat a selected one of said tubular members at a time can be positioned for cooperation with the lathe;

a movable member for advancing one of the bar stocks to be machined through said selected tubular member positioned at said operative position; and a plurality of stabilizing bodies each interengaging said tubular members at longitudinally spaced locations, said stabilizing bodies each having a plurality of compliant surfaces each respectively disposed in surrounding relation to an associated one of said tubular members, said compliant surfaces contacting said tubular members in a manner which permits axial thermal growth of said selected tubular member positioned at said operative position through said stabilizing bodies.

13. The bar feed assembly as claimed in claim 12, wherein said stabilizing bodies each comprise a plurality of clamp members each disposed in surrounding relation to a respective one of said tubular members, and wherein an intermediate material disposed between said clamp members and said tubular members forms said compliant surfaces.

14. The bar feed assembly as claimed in claim 13, wherein said stabilizing bodies each further comprise a support disc fixed to said clamp members, said support disc having a plurality of bores therethrough for receiving said tubular members.

15. The bar feed assembly as claimed in claim 13, wherein said clamp members are each formed from two semi-annular metallic sections secured to one another in a manner which compresses said intermediate material against said respective tubular members.

16. The bar feed assembly as claimed in claim 15, wherein said metallic sections comprise a metal selected from the group consisting of aluminum and steel.

17. The bar feed assembly as claimed in claim 13, wherein said intermediate material comprises rubber.

18. The bar feed assembly as claimed in claim 13, wherein said intermediate material comprises resin.

19. The bar feed assembly as claimed in claim 13, wherein said intermediate material comprises metal.

20. The bar feed assembly as claimed in claim 18, wherein said resin material is a 100% solid, two component, and inert filled casting compound.

21. The bar feed assembly as claimed in claim 12, further comprising hydraulic means for providing oil to said tubular member to provide hydro-dynamic support to the bar stock.

22. The bar feed assembly as claimed in claim 20, wherein said oil is provided under pressure and said movable member comprises a push-piston which is movable under the force of said oil pressure.

23. The bar feed assembly as claimed in claim 21, wherein said push piston is made from a plastic material.

24. The bar feed assembly as claimed in claim 12, wherein said tubular members are symmetrically arranged about a common axis, and wherein said tubular members are mounted for rotational indexing about said common axis.

* * * * *